US007016348B2

(12) United States Patent
Laursen et al.

(10) Patent No.: US 7,016,348 B2
(45) Date of Patent: Mar. 21, 2006

(54) METHOD AND SYSTEM FOR DIRECT ACCESS TO WEB CONTENT VIA A TELEPHONE

(75) Inventors: Arthur I. Laursen, Diablo, CA (US); David Israel, Santa Clara, CA (US)

(73) Assignee: IP Unity, Milpitas, CA (US)

( * ) Notice: Subject to any disclaimer, the term of this patent is extended or adjusted under 35 U.S.C. 154(b) by 749 days.

(21) Appl. No.: 09/939,798

(22) Filed: Aug. 28, 2001

(65) Prior Publication Data

US 2003/0043782 A1    Mar. 6, 2003

(51) Int. Cl.
*H04L 12/56* (2006.01)
(52) U.S. Cl. .................. 370/389; 379/88.17; 379/352; 709/217
(58) Field of Classification Search ................ 370/352, 370/354, 389, 401, 465, 466; 379/88.17; 700/94; 725/109; 709/217, 218, 219, 231
See application file for complete search history.

(56) References Cited

U.S. PATENT DOCUMENTS

| | | | | |
|---|---|---|---|---|
| 5,436,896 | A | | 7/1995 | Anderson et al. ............. 370/62 |
| 5,915,001 | A | * | 6/1999 | Uppaluru ................ 379/88.22 |
| 5,983,192 | A | | 11/1999 | Botzko et al. ............. 704/500 |
| 6,084,855 | A | | 7/2000 | Soirinsuo et al. ........... 370/235 |
| 6,118,790 | A | | 9/2000 | Bolosky et al. ............. 370/468 |
| 6,118,864 | A | | 9/2000 | Chang et al. ............... 379/225 |
| 6,133,940 | A | * | 10/2000 | Noonen et al. ........... 348/14.03 |
| 6,263,371 | B1 | | 7/2001 | Geagan et al. ............. 709/231 |
| 6,282,192 | B1 | | 8/2001 | Murphy et al. ............. 370/352 |
| 6,282,193 | B1 | | 8/2001 | Hluchyj ................... 370/356 |
| 6,404,745 | B1 | | 6/2002 | O'Neill .................... 370/260 |
| 6,421,338 | B1 | | 7/2002 | Byers ...................... 370/352 |
| 6,466,550 | B1 | | 10/2002 | Foster ..................... 370/261 |
| 6,567,419 | B1 | | 5/2003 | Yarlagadda ................ 370/466 |

(Continued)

FOREIGN PATENT DOCUMENTS

WO          01/52503         1/2001

OTHER PUBLICATIONS

Wolter, Charlotte, "Serving the Media—new Type of Product Will Turbocharge Voice, Audio and Video Apps," Sounding Board—HP Communications Markets and Technology, posted Apr. 2001.

(Continued)

*Primary Examiner*—Steven Nguyen
*Assistant Examiner*—Clemence Han
(74) *Attorney, Agent, or Firm*—Sterne Kessler Goldstein Fox PLLC

(57) ABSTRACT

The present invention provides a method and system for providing web audio content directly from audio processors to a telephone without requiring storage of the audio on a media server. In one embodiment, a switch and two stages of switching are used. The switch is coupled between at least one audio source and a network interface controller. A direct access controller is coupled to the audio sources, switch and network interface controller. The direct access controller establishes a first audio channel through the switch in a connection phase. The direct access controller establishes a second audio channel through the switch in an audio transport phase. In the audio transport phase, web audio content is transported directly from a remote web server to an audio source on the second audio channel and then from the audio source to the user of the telephone on the first audio channel. In another embodiment, a method and system for provides web video content directly from processors to a telephone without requiring storage of the video on a media server.

20 Claims, 15 Drawing Sheets

U.S. PATENT DOCUMENTS

| | | |
|---|---|---|
| 6,584,098 B1 | 6/2003 | Dutnall ................ 370/354 |
| 6,587,822 B1 * | 7/2003 | Brown et al. ............ 704/275 |
| 6,718,015 B1 * | 4/2004 | Berstis ................ 379/88.17 |
| 6,721,705 B1 * | 4/2004 | Kurganov et al. ....... 704/270.1 |
| 6,771,743 B1 * | 8/2004 | Butler et al. ............ 379/67.1 |
| 6,775,358 B1 * | 8/2004 | Breitenbach et al. .... 379/88.13 |
| 6,823,370 B1 * | 11/2004 | Kredo et al. ............ 709/206 |
| 2001/0012350 A1 * | 8/2001 | Ehlinger ................ 379/196 |
| 2001/0030958 A1 | 10/2001 | Kichise ................ 370/352 |
| 2002/0075850 A1 | 6/2002 | Cruz et al. ............ 370/352 |
| 2002/0075879 A1 | 6/2002 | Ramey ................ 370/401 |
| 2002/0103919 A1 | 8/2002 | Hannaway ............ 709/231 |
| 2002/0122430 A1 | 9/2002 | Haberman et al. ...... 370/429 |
| 2002/0124100 A1 * | 9/2002 | Adams ................ 709/232 |
| 2002/0133247 A1 | 9/2002 | Smith et al. ............ 700/94 |
| 2002/0164000 A1 * | 11/2002 | Cohen et al. ......... 379/88.17 |
| 2002/0170067 A1 | 11/2002 | Norstrom et al. ........ 725/109 |
| 2003/0035519 A1 * | 2/2003 | Warmus .............. 379/88.17 |
| 2003/0045957 A1 | 3/2003 | Haberman et al. ........ 700/94 |
| 2003/0053429 A1 | 3/2003 | Choi et al. .............. 370/331 |
| 2004/0028195 A1 * | 2/2004 | Leyden et al. ......... 379/88.17 |

OTHER PUBLICATIONS

Michael, Bill, "Network Based Media Servers: The New Generation," Communications Convergence.com, Apr. 5, 2001, internet address: http://www.computertelephony.com/article/CTM20010326S0007, Aug. 17, 2001; 5 pages.

Collins, D., "Carrier Grade Voice Over IP", McGraw-Hill Companies, Inc., New York, NY, 2001 (entire book provided).

* cited by examiner

METHOD AND SYSTEM FOR DIRECT ACCESS TO WEB CONTENT VIA A TELEPHONE

BACKGROUND OF THE INVENTION

1. Field of the Invention

The invention relates generally to communication over a network.

2. Background Art

Audio has long been carried in telephone calls over networks. Traditional circuit-switched time division multiplexing (TDM) networks including public-switched telephone networks (PSTN) and plain old telephone networks (POTS) were used. These circuit-switched networks establish a circuit across the network for each call. Audio is carried in analog and/or digital form across the circuit in real-time.

The emergence of packet-switched networks, such as the local area networks (LANs), and the Internet, now requires that audio and video be carried digitally in packets. Audio can include but is not limited to voice, music, or other types of audio data. Voice over the Internet systems (also called Voice over IP or VOIP systems) transport the digital audio data belonging to a telephone call in packets over packet-switched networks instead of traditional circuit-switched networks. In one example, a VOIP system forms two or more connections using Transmission Control Protocol/ Internet Protocol (TCP/IP) addresses to accomplish a connected telephone call. Devices that connect to a VOIP network must follow standard TCP/IP packet protocols in order to interoperate with other devices within the VOIP network. Examples of such devices are integrated access devices, media gateways, and media servers.

A media server is often an endpoint in a VOIP telephone call. The media server is responsible for ingress and egress audio streams, that is, audio streams which enter and leave a media server respectively. The type of audio produced by a media server is controlled by the application that corresponds to the telephone call such as voice mail, conference bridge, interactive voice response (IVR), etc. In many applications, the produced audio is not predictable and must vary based on end user responses. Words and sentences must be assembled dynamically in real time as they are played out in audio streams.

Packet-switched networks, however, can impart delay and jitter in a stream of audio carried in a telephone call. A real-time transport protocol (RTP) is often used to control delays, packet loss and latency in an audio stream played out of a media server. The audio stream can be played out using RTP over a network link to a real-time device (such as a telephone) or a non-real-time device (such as an email client in unified messaging). RTP operates on top of a protocol such as the User Datagram Protocol (UDP) which is part of the IP family. RTP packets include among other things a sequence number and a timestamp. The sequence number allows a destination application using RTP to detect the occurrence of lost packets and to ensure a correct order of packets are presented to a user. The timestamp corresponds to the time at which the packet was assembled. The timestamp allows a destination application to ensure synchronized play-out to a destination user and to calculate delay and jitter. See, D. Collins, *Carrier Grade Voice over IP*, Mc-Graw Hill: United States, Copyright 2001, pp. 52–72, the entire book of which is incorporated in its entirety herein by reference.

Along with the development of VOIP systems, a separate development of World Wide Web technology has occurred. Web servers are used to deliver a rich variety of content including audio content (referred to herein as "web audio content"). Web servers originally provided all types of web content to computing devices such as personal computers. A personal computer must have an appropriate browser, plug-in, and media player for a user to view the web content. For example, to view (i.e. hear) web audio content such as a .wav file, a media player such as Real Player, Quicktime or Windows Media needs to be installed on the personal computer. Telephones which cannot handle such media players have not been able to view web audio content.

One approach to delivering web audio content is to store audio data at a media server. This audio data can then be delivered in real-time to a telephone. Such an approach is very limited as the media server is required to prestore large amounts of data from which a telephone user can select. This is impractical and expensive as the number of users and quantity of web audio content desired to be heard increases.

What is needed is a system and method for allowing web content to be delivered to any telephone without requiring a media server to store large amounts of web content.

BRIEF SUMMARY OF THE INVENTION

The present invention provides a method and system for providing web audio content directly from remote web sites through audio processors to a telephone without requiring permanent storage of audio on a media server. Only the web audio content to be heard at a telephone needs to be buffered at a media server.

In one embodiment, a direct access system is provided. The direct access system includes a direct access controller coupled to one or more audio sources, a switch and one or more network interface controllers. The switch is coupled between the audio source(s) and network interface controller (s). The switch can be a packet switch or a cell switch. This switching system is dynamic and can scale to handle many calls and requests for web audio content.

The direct access controller establishes a first audio channel through the cell switch in a connection phase. The direct access controller establishes a second audio channel through the cell switch in an audio transport phase. In the connection phase, a call is established and web content identifier information is determined. In the audio transport phase, web audio content corresponding to the web content identifier information is accessed. In particular, the web audio content is transported directly from a remote web server to an audio source on the second audio channel and then from the audio source to the user of the telephone on the first audio channel.

In one embodiment, a method for providing a user of a telephone with direct access to web audio content over a network includes a connection phase and an audio transport phase. The connection phase includes: dialing a media server, accepting a call at the media server, prompting the user for web content identifier information, and establishing an internal connection between a network interface controller and an audio source. The audio transport phase includes: initiating a file transfer of the web audio content from a remote web server identified in the web content identifier information to the audio source, buffering audio payloads containing audio data from the file transferred from the remote web server, and delivering the buffered audio data in an audio stream to the telephone.

In one embodiment, the file transfer initiating step includes receiving RTP packets from the remote web server at a network interface controller (NIC), converting the received RTP packets to internal packets having an audio payload and control header, and sending the internal packets on the link through the cell switch to the audio source. The buffering step includes storing internal packets at the audio source. The internal packets includes audio payloads from the sent internal packets received at the audio source and a control header having the address of a link between the audio source through the cell switch to a network interface controller coupled to the telephone. The buffered audio delivering step includes sending the stored internal packets from the audio source through the cell switch to the network interface controller coupled to the telephone, converting the sent internal packets at the network interface controller to RTP packets, and forwarding the RTP packets to the telephone for play by the user. The present invention is not limited to RTP packets and in general any type of IP packet carrying audio can received and sent by a NIC in embodiments of the present invention.

In one feature of the invention, the internal packets are smaller than RTP packets and consist of payload and control header information only. In this way, processing work required to create RTP packets need not be carried out by audio sources such as DSPs but is distributed to packet processors in the network interface controller.

According to further feature, the cell switch is a fully meshed cell switch such as an ATM cell switch. The internal packets for the different audio channels are converted to and from cells. A link through the cell switch comprises a switched virtual circuit (SVC) established temporarily for each call. An address of a channel on the link comprises a VPI/VCI that identifies a switch virtual path and switch virtual channel. The internal packet sending includes converting the internal packets to one or more ATM cells and sending the ATM cells to the cell switch.

Web audio content can be any type of audio delivered by a web server. Web audio content can include but is not limited to voice, music, tones, and/or video.

In a further embodiment, a method and system provides web video content directly from processors to a telephone without requiring storage of the video on a media server.

The direct access controller can be a stand-alone unit or a part of a call control and audio feature manager in an audio processing platform. The present invention can be implemented in a media server, audio processor, or audio processing platform.

Further embodiments, features, and advantages of the present inventions, as well as the structure and operation of the various embodiments of the present invention, are described in detail below with reference to the accompanying drawings.

BRIEF DESCRIPTION OF THE DRAWINGS

The accompanying drawings, which are incorporated herein and form a part of the specification, illustrate the present invention and, together with the description, further serve to explain the principles of the invention and to enable a person skilled in the pertinent art to make and use the invention.

In the drawings.

Figure 1:
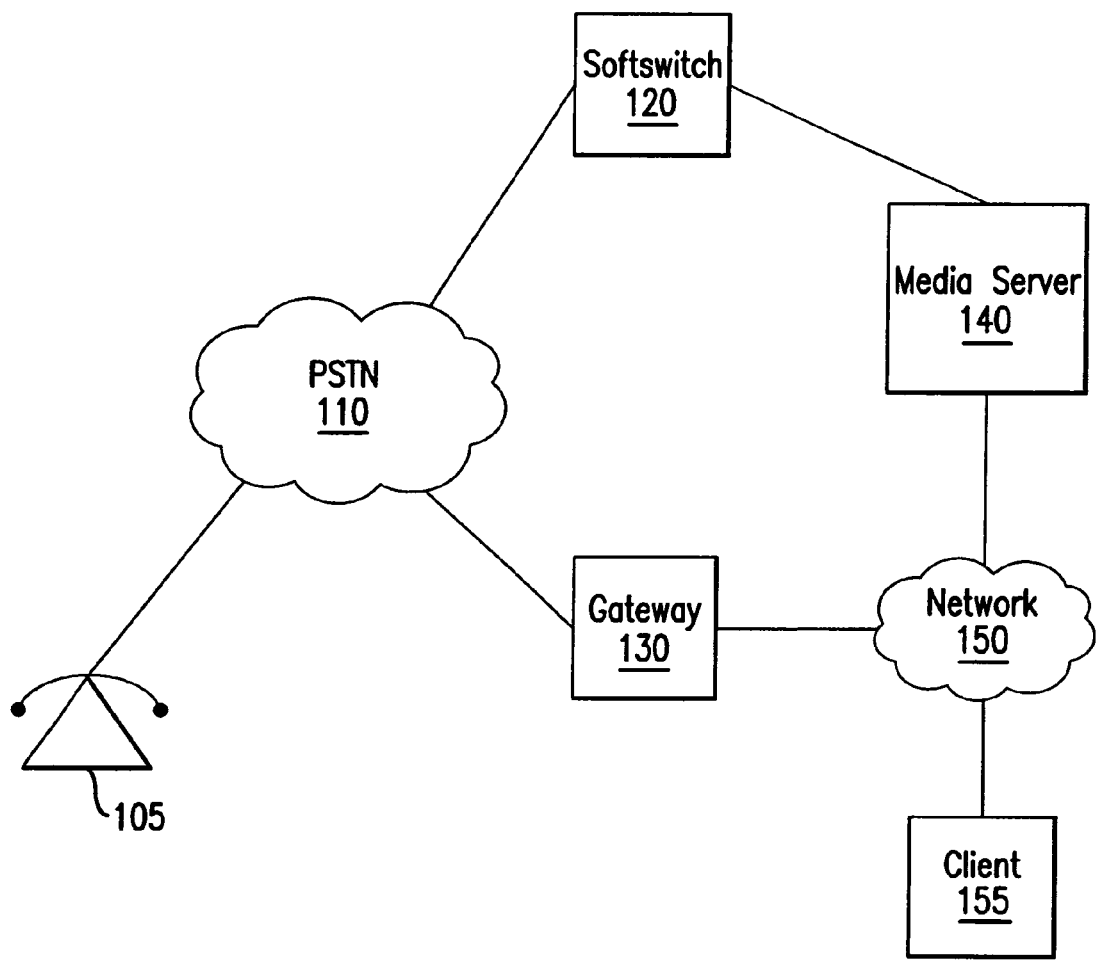
FIG. 1 is a diagram of a media server in a voice over the Internet example environment according to the present invention.

The present invention will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE INVENTION

Table of Contents

I. Overview and Discussion
II. Terminology
III. Audio Networking Environment
IV. Media Server, Services and Resources
V. Audio Processing Platform with a Switch
VI. Example Audio Processing Platform Implementation
VII. Call Control and Audio Feature Manager
VIII. Audio Processing Platform Operation
   A. Ingress Audio Streams
   B. Egress Audio Streams
IX. Packets
   A. IP Packets with RTP Information
   B. Internal Packets
X. Direct Access to Web Audio Content
   A. System
   B. Direct Access Controller
   C. Fully Meshed Switch
   D. Two-Stage Ingress and Egress Switching
   E. Routine for Direct Access to Web Content via Telephone
      i. Connection Phase
      ii. Audio Transport Phase
XI. Control Logic
XII. Conclusion I. Overview and Discussion The present invention provides a method and system for providing direct access to web audio content on a network (such as a TCP/IP network) via a telephone. The present invention is described in terms of an example voice over the Internet environment. Description in these terms is provided for convenience only. It is not intended that the invention be limited to application in these example environments. In fact, after reading the following description, it will become apparent to a person skilled in the relevant art how to implement the invention in alternative environments known now or developed in the future.

II. Terminology

To more clearly delineate the present invention, an effort is made throughout the specification to adhere to the following term definitions as consistently as possible.

The term web audio content refers to any type of audio available on the Web or a network (such as a TCP/IP network). Such audio can include audio in a video stream.

The term digital signal processor (DSP) includes but is not limited to a device used to code or decode digitized voice samples according to a program or application service.

The term digitized voice or voice includes but is not limited to audio byte samples produced in a pulse code modulation (PCM) architecture by a standard telephone circuit compressor/decompressor (CODEC).

The term packet processor refers to any type of packet processor that creates packets for a packet-switched network. In one example, a packet processor is a specialized microprocessor designed to examine and modify Ethernet packets according to a program or application service.

The term packetized voice refers to digitized voice samples carried within an Ethernet packet.

The term real time protocol (RTP) stream of audio refers to the sequence of RTP packets associated with one channel of packetized voice.

The term switched virtual circuit (SVC) refers to a temporary virtual circuit that is set up and used only as long as data is being transmitted. Once the communication between the two hosts is complete, the SVC disappears. In contrast, a permanent virtual circuit (PVC) remains available at all times.

III. Audio Networking Environment

The present invention can be used in any audio networking environment. Such audio networking environments can include but are not limited to a wide area and/or local area network environment. In example embodiments, the present invention is incorporated within an audio networking environment as a stand-alone unit or as part of a media server, packet router, packet switch or other network component. For brevity, the present invention is described with respect to embodiments incorporated in a media server.

Media servers deliver audio on network links over one or more circuit-switched and/or packet-switched networks to local or remote clients. A client can be any type of device that handles audio including but not limited to a telephone, cellular phone, personal computer, personal data assistant (PDA), set-top box, console, or audio player. FIG. 1 is a diagram of a media server 140 in an voice over the Internet example environment according to the present invention. This example includes a telephone client 105, public-switched telephone network (PSTN) 110, softswitch 120, gateway 130, media server 140, packet-switched network(s) 150, and computer client 155. Telephone client 105 is any type of phone (wired or wireless) that can send and receive audio over PSTN 110. PSTN 110 is any type of circuit-switched network(s). Computer client 155 can be a personal computer.

Telephone client 105 is coupled through a public-switched telephone network (PSTN) 110, gateway 130 and network 150 to media server 140. In this example, call signaling and control is separated from the media paths or links that carry audio. Softswitch 120 is provided between PSTN 110 and media server 140. Softswitch 120 supports call signaling and control to establish and remove voice calls between telephone client 105 and media server 140. In one example, softswitch 120 follows the Session Initiation Protocol (SIP) or similar call control protocol. Gateway 130 is responsible for converting audio passing to and from PSTN 110 and network 150. This can include a variety of well-known functions such as translating a circuit-switched telephone number to an Internet Protocol (IP) address and vice versa.

Computer client 155 is coupled over network 150 to media server 140. A media gateway controller (not shown) can also use SIP to support call signaling and control to establish and breakdown links such as voice calls between computer client 155 and media server 140. An application server (not shown) can also be coupled to media server 140 to support VOIP services and applications.

The present invention is described in terms of these example environments. Description in these terms is provided for convenience only. It is not intended that the invention be limited to application in these example environments involving a media server, router, switch, network component, or stand-alone unit within a network. In fact, after reading the following description, it will become apparent to a person skilled in the relevant art how to implement the invention in alternative environments known now or developed in the future.

IV. Media Server, Services and Resources

Figure 2:
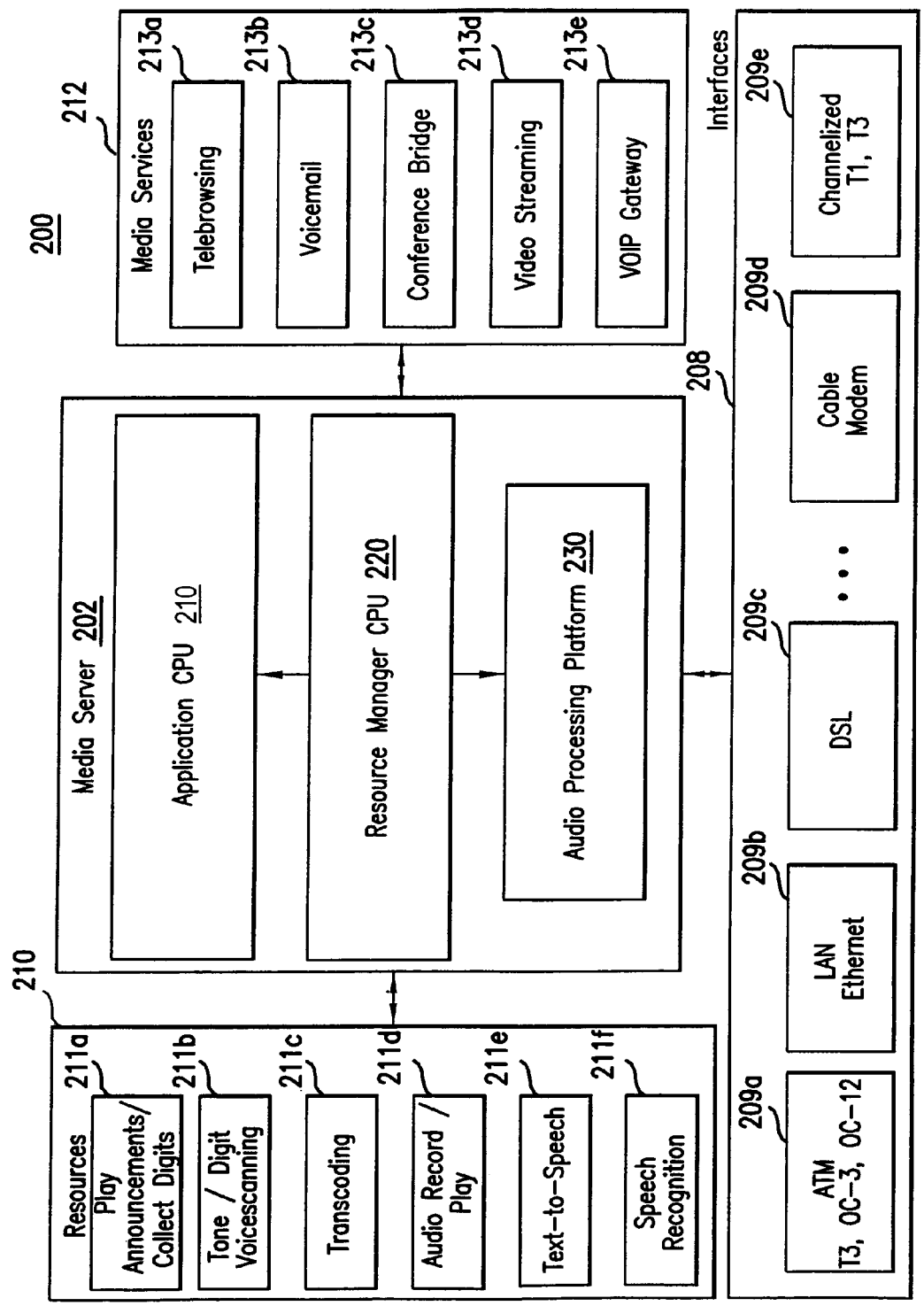
FIG. 2 is a diagram of an example media server including media services and resources according to the present invention.

FIG. 2 is a diagram of an example media platform 200 according to one embodiment the present invention. Platform 200 provides scalable VOIP telephony. Media platform 200 includes a media server 202 coupled to resource(s) 210, media service(s) 212, and interface(s) 208. Media server 202 includes one or more applications 210, a resource manager 220 and audio processing platform 230. Media server 202 provides resources 210 and services 212. Resources 210 include, but are not limited to modules 211a–f, as shown in FIG. 2. Resource modules 211a–f include conventional resources such as play announcements/collect digits IVR resources 211a, tone/digit voice scanning resource 211b, transcoding resource 211c, audio record/play resource 211d, text-to-speech resource 211e, and speech recognition resource 211f. Media services 212 include, but are not limited to, modules 213a–e, as shown in FIG. 2. Media services modules 213a–e include conventional services such as telebrowsing 213a, voice mail service 213b, conference bridge service 213c, video streaming 213d, and a VOIP gateway 213e.

Media server 202 includes an application central processing unit (CPU) 210, a resource manager CPU 220, and an audio processing platform 230. Application CPU 210 is any processor that supports and executes program interfaces for applications and applets. Application CPU 210 enables platform 200 to provide one or more of the media services 212. Resource manager CPU 220 is any processor that controls connectivity between resources 210 and the application CPU 210 and/or audio processing platform 230. Audio processing platform 230 provides communications connectivity with one or more of the network interfaces 208. Media platform 200 through audio processing platform 230 receives and transmits information via network interface 208. Interface 208 can include, but it not limited to, Asynchronous TransferMode (ATM) 209a, local area network (LAN) Ethernet 209b, digital subscriber line (DSL) 209c, cable modem 209d, and channelized T1–T3 lines 209e.

V. Audio Processing Platform with a Switch

In one embodiment of the present invention, audio processing platform 230 includes a dynamic fully-meshed switch 304 and other components for the reception and processing of packets, such as Internet Protocol (IP) packets.

As illustrated, audio processing platform 230 includes a call control and audio feature manager 302, cell switch 304 (also referred to as a packet/cell switch to indicate cell switch 304 can be a cell switch or packet switch), network connections 305, network interface controller 306, and audio channel processors 308. Network interface controller 306 further includes packet processors 307. Call control and audio feature manager 302 is coupled to cell switch 304, network interface controller 306, and audio channels processors 308. In one configuration, call control and audio feature manager 302 is connected directly to the network interface controller 306. Network interface controller 306 then controls packet processor 307 operation based on the control commands sent by call control and audio feature manager 302.

In one embodiment, call control and audio feature manager 302 controls switch 304, network interface controller 306 (including packet processors 307), and audio channel processors 308 to provide direct access to web content according to the present invention. This direct access is described further below with respect to FIGS. 6–8. An embodiment of the call control and audio feature manager 302 according to the present invention is described further below with respect to FIG. 3B.

Network connections 305 are coupled to packet processors 307. Packet processors 307 are also coupled to cell switch 304. Cell switch 304 is coupled in turn to audio channel processors 308. In one embodiment, audio channel processors 308 include four channels capable of handling four calls, i.e., there are four audio processing sections. In alternative embodiments, there are more or less audio channel processors 308.

Data packets, such as IP packets, that include payloads having audio data arrive at network connections 305. In one embodiment, packet processors 307 comprise one or more or eight 100Base-TX full-duplex Ethernet links capable of high speed network traffic in the realm of 300,000 packets per second per link. In another embodiment, packet processors 307 are capable of 1,000 G.711 voice ports per link and/or 8,000 G.711 voice channels per system.

In additional embodiments, packet processors 307 recognize the IP headers of packets and handle all RTP routing decisions with a minimum of packet delay or jitter.

In one embodiment of the present invention, packet/cell switch 304 is a non-blocking switch with 2.5 Gbps of total bandwidth. In another embodiment, the packet/cell switch 204 has 5 Gbps of total bandwidth.

Figure 4A:
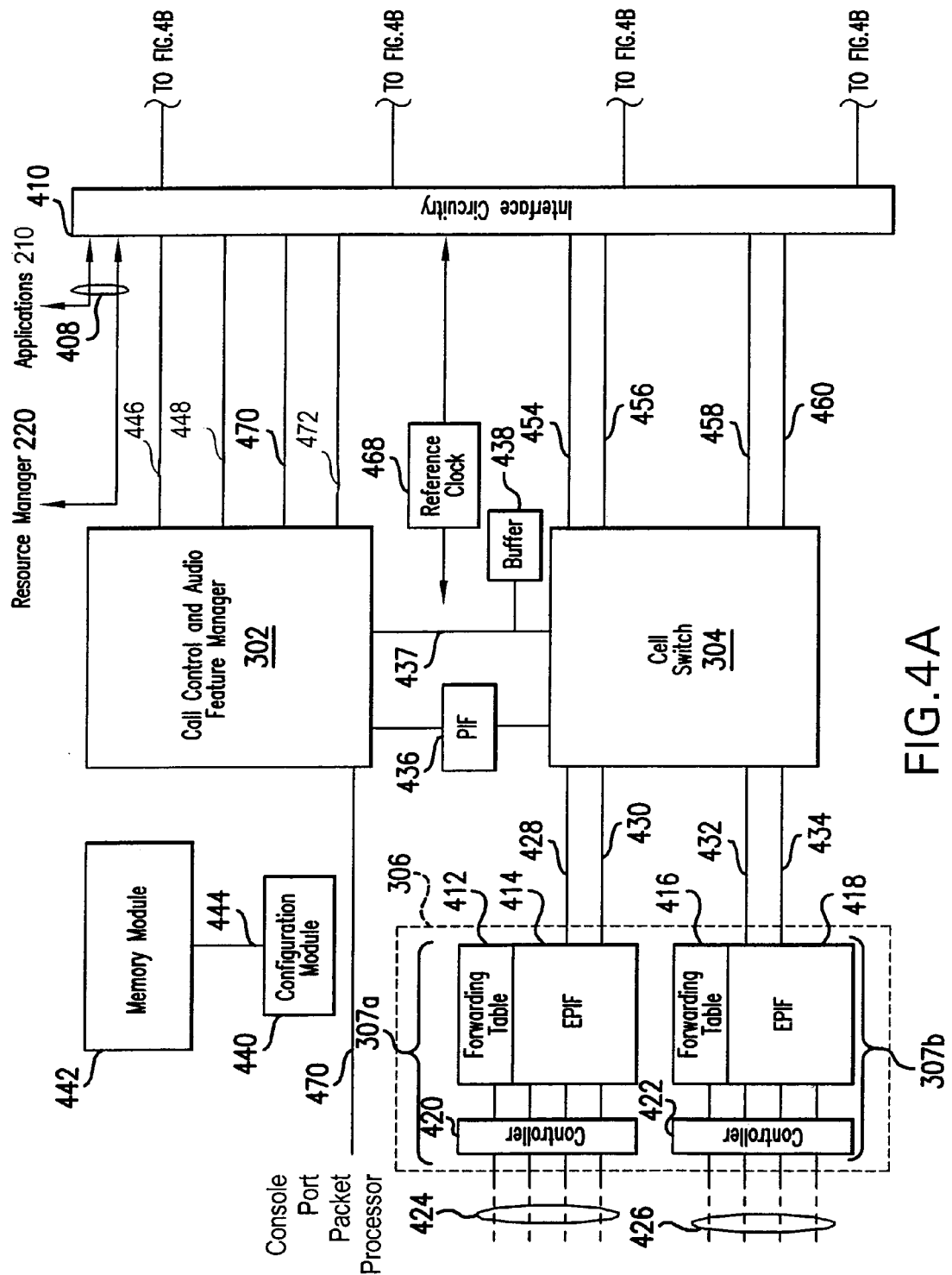
FIGS. 4A and 4B are diagrams of a audio processing platform as shown in FIG. 3 according to an example implementation of the present invention.
Figure 4B:
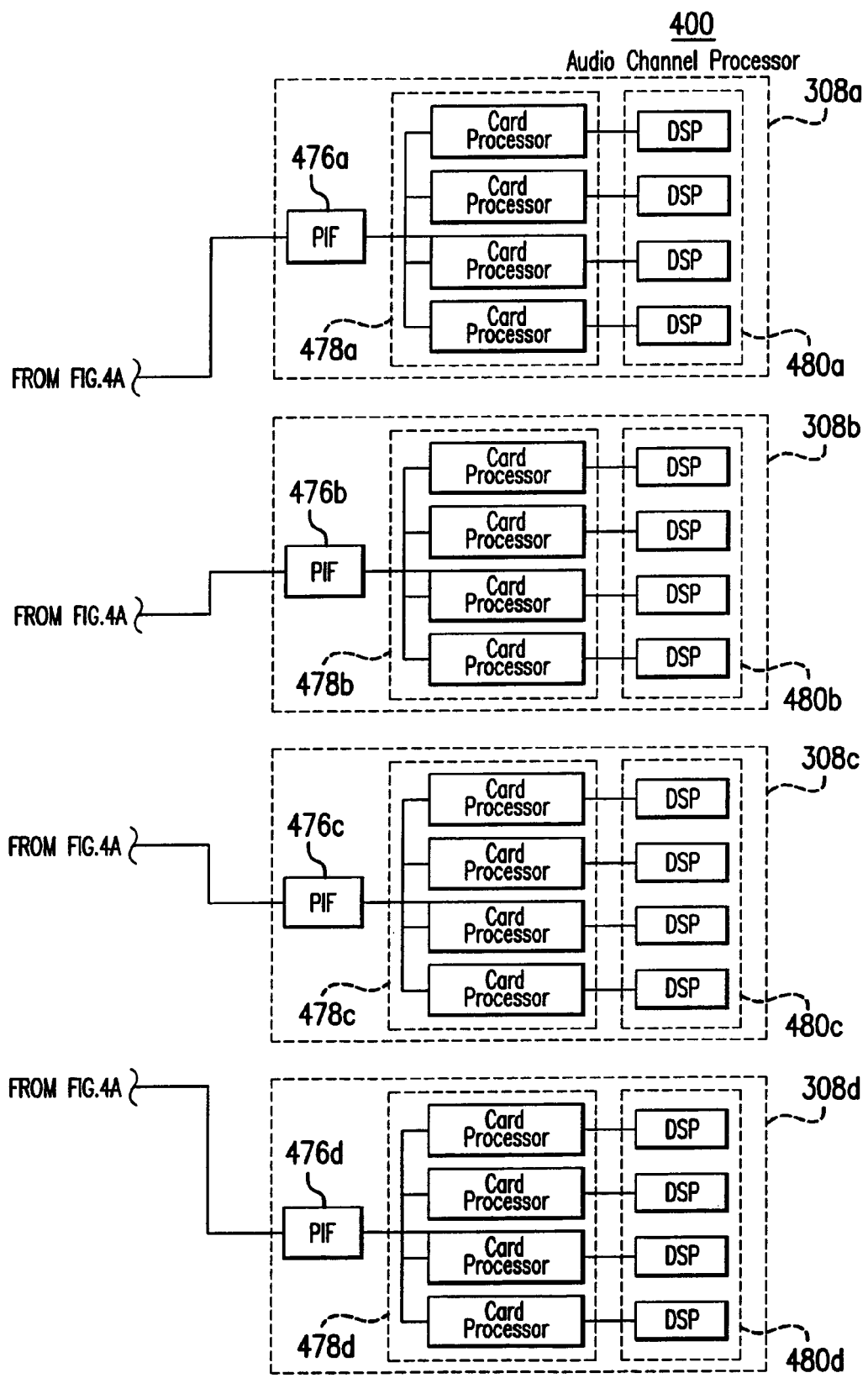

In one embodiment, the audio channel processors 308 comprise any audio source, such as digital signal processors, as described in further detail with regards to FIGS. 4A and 4B. The audio channel processors 308 can perform audio related services including one or more of the services 211a–f.

VI. Example Audio Processing Platform Implementation

FIGS. 4A and 4B show one example implementation which is illustrative and not intended to limit the present invention. As shown in FIGS. 4A and 4B, audio processing platform 230 can be a shelf controller card (SCC). System 400 embodies one such SCC. System 400 includes cell switch 304, call control and audio feature manager 302, a network interface controller 306, interface circuitry 410, and audio channel processors 308a–d.

More specifically, system 400 receives packets at network connections 424 and 426. Network connections 424 and 426 are coupled to network interface controller 306. Network interface controller 306 includes packet processors 307a–b. Packet processors 307a–b comprise controllers 420, 422, forwarding tables 412, 416, and forwarding processor (EPIF) 414, 418. As shown in FIG. 4A, packet processor 307a is coupled to network connection 424. Network connection 424 is coupled to controller 420. Controller 420 is coupled to both forwarding table 412 and EPIF 414. Packet processor 307b is coupled to network connection 426. Network connection 426 is coupled to controller 422. Controller 422 is coupled to both forwarding table 416 and EPIF 418.

In one embodiment, packet processors 307 can be implemented on one or more LAN daughtercard modules. In another embodiment, each network connection 424 and 426 can be a 100Base-TX or 1000Base-T link.

The IP packets received by the packet processors 307 are processed into internal packets. When a cell layer is used, the internal packets are then converted to cells (such as ATM cells by a conventional segmentation and reassembly (SAR) module). The cells are forwarded by packet processors 307 to cell switch 304. The packet processors 307 are coupled to the cell switch 304 via cell buses 428, 430, 432, 434. Cell switch 304 forwards the cells to interface circuitry 410 via cell buses 454, 456, 458, 460. Cell switch 304 analyzes each of the cells and forwards each of the cells to the proper cell bus of cell buses 454, 456, 458, 460 based on an audio channel for which that cell is destined. Cell switch 304 is a dynamic, fully-meshed switch.

In one embodiment, interface circuitry 410 is a backplane connector.

The resources and services available for the processing and switching of the packets and cells in system 400 are provided by call control and audio feature manager 304. Call control and audio feature manager 302 is coupled to cell switch 402 via a processor interface (PIF) 436, a SAR, and a local bus 437. Local bus 437 is further coupled to a buffer 438. Buffer 438 stores and queues instructions between the call control and audio feature manager 302 and the cell switch 304.

Call control and audio feature manager 302 is also coupled to a memory module 442 and a configuration module 440 via bus connection 444. In one embodiment, configuration module 440 provides control logic for the boot-up, initial diagnostic, and operational parameters of call control and audio feature manager 302. In one embodiment, memory module 442 comprises dual in-line memory modules (DMs) for random access memory (RAM) operations of call control and audio feature manager 302.

Call control and audio feature manager 302 is further coupled to interface circuitry 410. A network conduit 408 couples resource manager CPU 220 and/or application CPU 210 to the interface circuitry 410. In one embodiment, call control and audio feature manager 302 monitors the status of the interface circuitry 410 and additional components coupled to the interface circuitry 410. In another embodiment, call control and audio feature manager 302 controls the operations of the components coupled to the interface circuitry 410 in order to provide the resources 210 and services 212 of platform 200.

A console port 470 is also coupled to call control and audio feature manager 302. Console port 470 provides direct access to the operations of call control and audio feature manager 302. For example, one could administer the operations, re-boot the media processor, or otherwise affect the performance of call control and audio feature manager 302 and thus the system 400 using the console port 470.

Reference clock 468 is coupled to interface circuitry 410 and other components of the system 400 to provide consistent means of time-stamping the packets, cells and instructions of the system 400.

Interface circuitry 410 is coupled to each of audio channel processors 308a–308d. Each of the processors 308 comprise a PIF 476, a group 478 of one or more card processors (also referred to as "bank" processors), and a group 480 of one or more digital signal processors (DSP) and SDRAM buffers. In one embodiment, there are four card processors in group 478 and 32 DSPs in group 480. In such an embodiment, each card processor of group 478 would access and operate with eight DSPs of group 480.

VII. Call Control and Audio Feature Manager

Figure 3A:
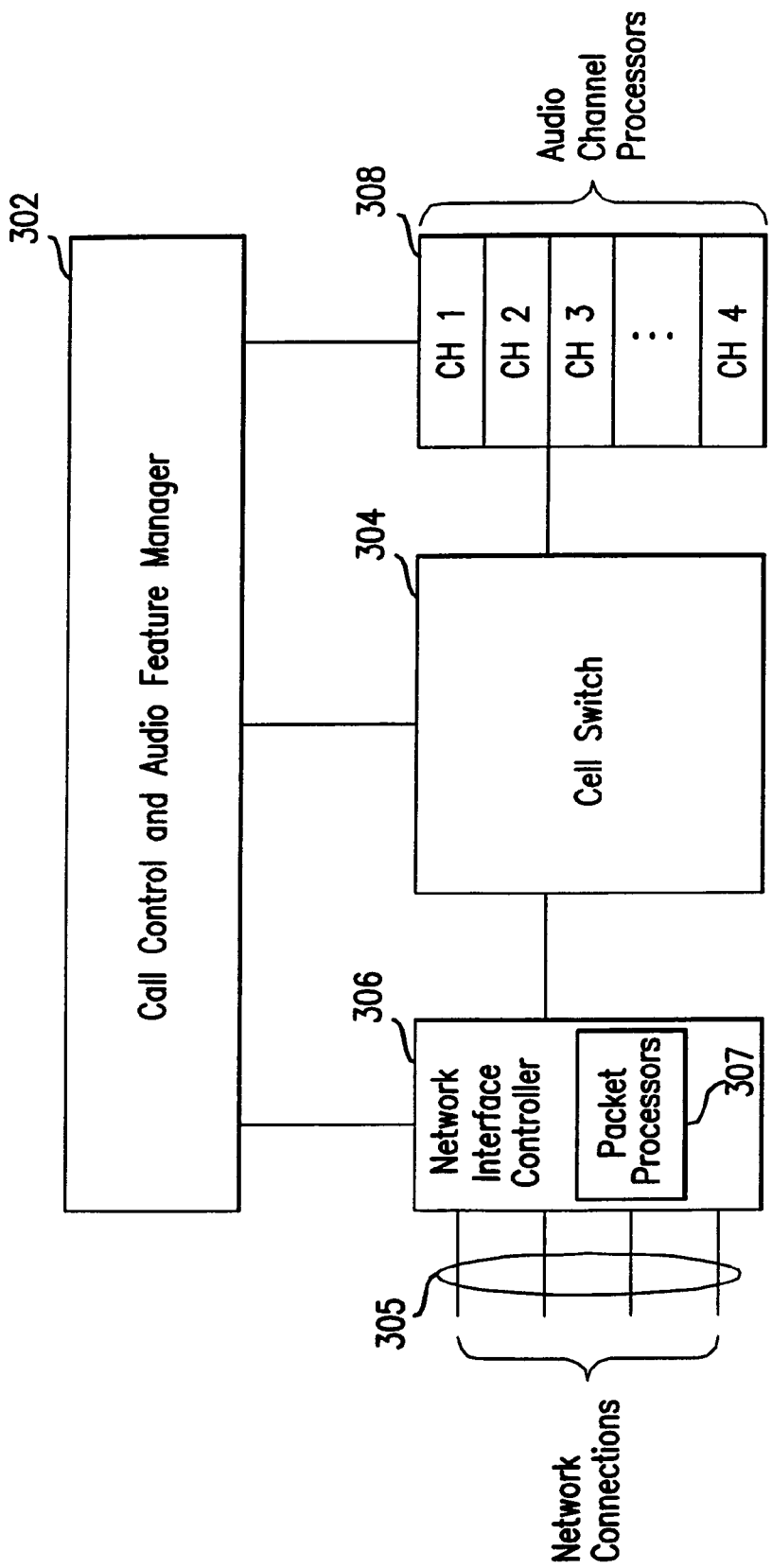
FIGS. 3A and 3B are diagrams of an audio processing platform according to an embodiment of the present invention.
Figure 3B:
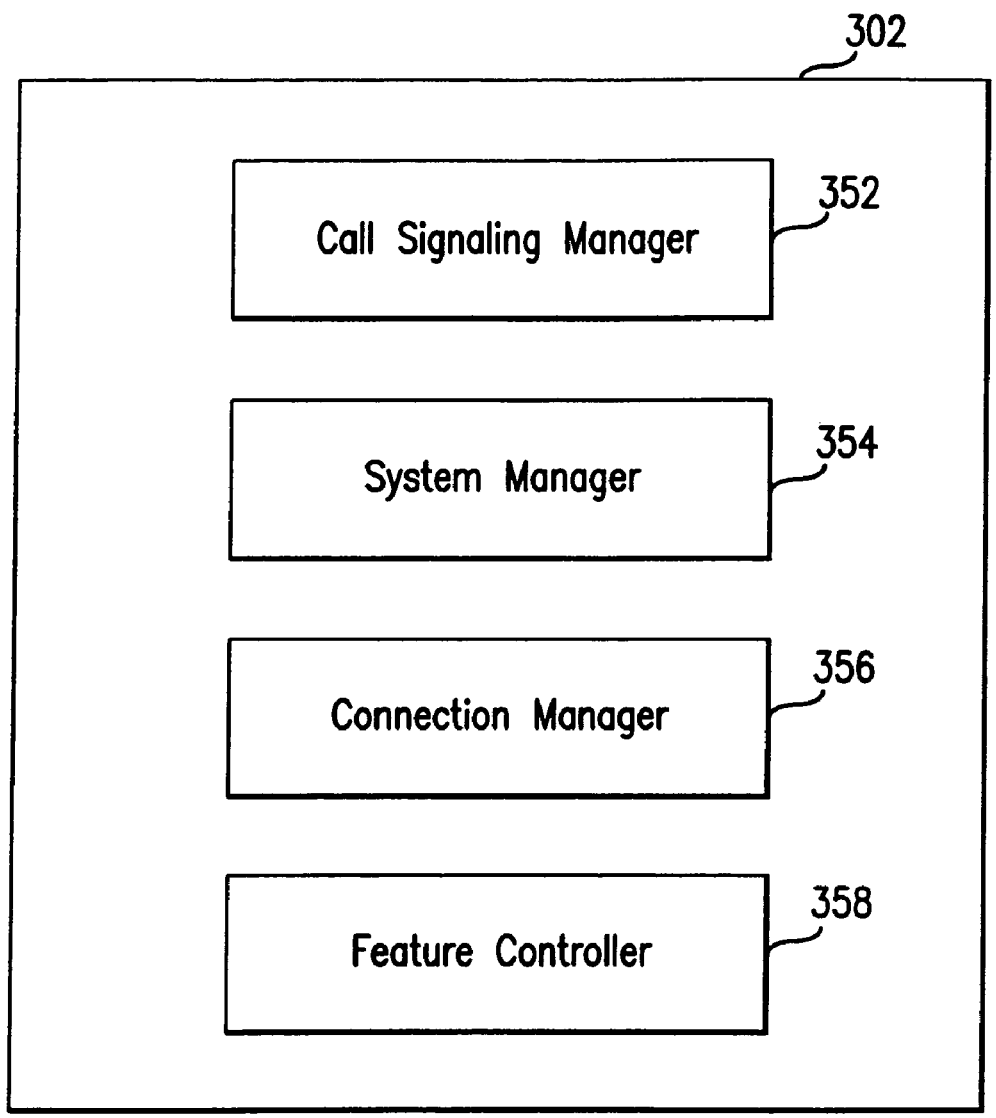

FIG. 3B is a block diagram of call control and audio feature manager 302 according to one embodiment of the present invention. Call control and audio feature manager 302 is illustrated functionally as processor 302. Processor 302 comprises a call signaling manager 352, system manager 354, connection manager 356, and feature controller 358.

Call signaling manager 352 manages call signaling operation such as call establishment and removal, interface with a softswitch, and handling signaling protocols like SIP.

System manager 354 performs bootstrap and diagnostic operations on the components of system 230. System manager 354 further monitors the system 230 and controls various hot-swapping and redundant operation.

Connection manager 356 manages EPIF forwarding tables, such as tables 412 and 416, and provides the routing protocols (such as Routing Information Protocol (RIP), Open Shortest Path First (OSPF), and the like. Further, the connection manager 356 establishes internal ATM permanent virtual circuits (PVC) and/or SVC. In one embodiment, the connection manager 356 establishes bi-directional connections between the network connections, such as network connections 424 and 426, and the DSP channels, such as DSPs 480a–d, so that data flows can be sources or processed by a DSP or other type of channel processor.

In another embodiment, connection manager 356 abstracts the details of the EPIF and ATM hardware. Call signaling manager 352 and the resource manager CPU 220 can access these details so that their operations are based on the proper service set and performance parameters.

Feature controller 358 provides communication interfaces and protocols such as, H.323, and MGCP (Media Gateway Control Protocol).

In one embodiment, card processors 478a–d function as controllers with local managers for the handling of instructions from the call control and audio feature manager 302 and any of its modules: call signaling manager 352, system manager 354, connection manager 356, and feature controller 358. Card processors 478a–d then manage the DSP banks, network interfaces and media streams, such as audio streams.

In one embodiment, the DSPs 480a–d provide the resources 210 and services 212 of platform 200.

In one embodiment, call control and audio feature manager 302 of the present invention exercises control over the EPIF of the present invention through the use of applets. In such an embodiment, the commands for configuring parameters (such as port MAC address, port IP address, and the like), search table management, statistics uploading, and the like, are indirectly issued through applets.

The EPIF provides a search engine to handle the functionality related to creating, deleting and searching entries. Since the platform 200 operates on the source and destination of packets, the EPIF provides search functionality of sources and destinations. The sources and destinations of packets are stored in search tables for incoming (ingress) and outgoing (egress) addresses. The EPIF can also manage RTP header information and evaluating relative priorities of egress audio streams to be transmitted.

VIII. Audio Processing Platform Operation

Figure 5A:
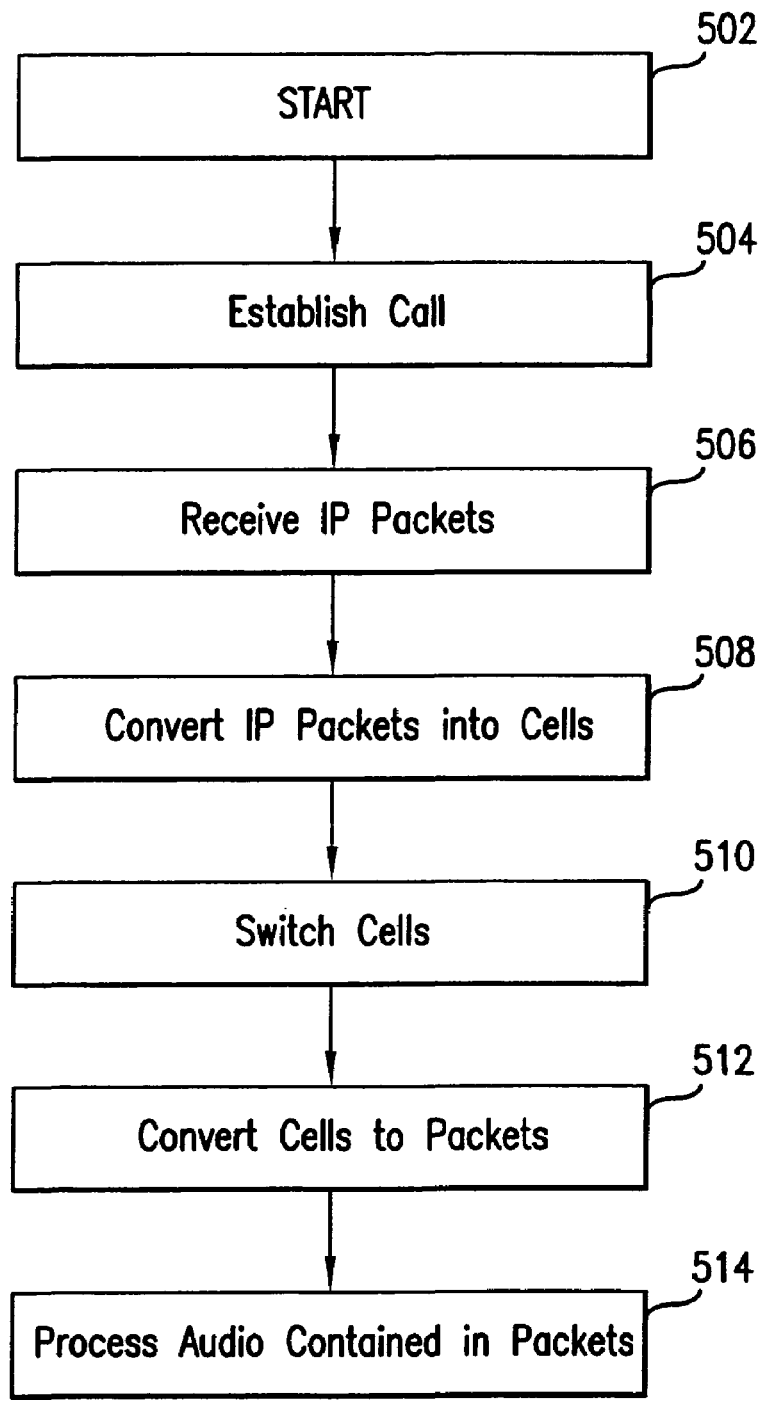
FIG. 5A is a flow diagram showing the establishment of a call and ingress packet processing according to an embodiment of the present invention.
Figure 5B:
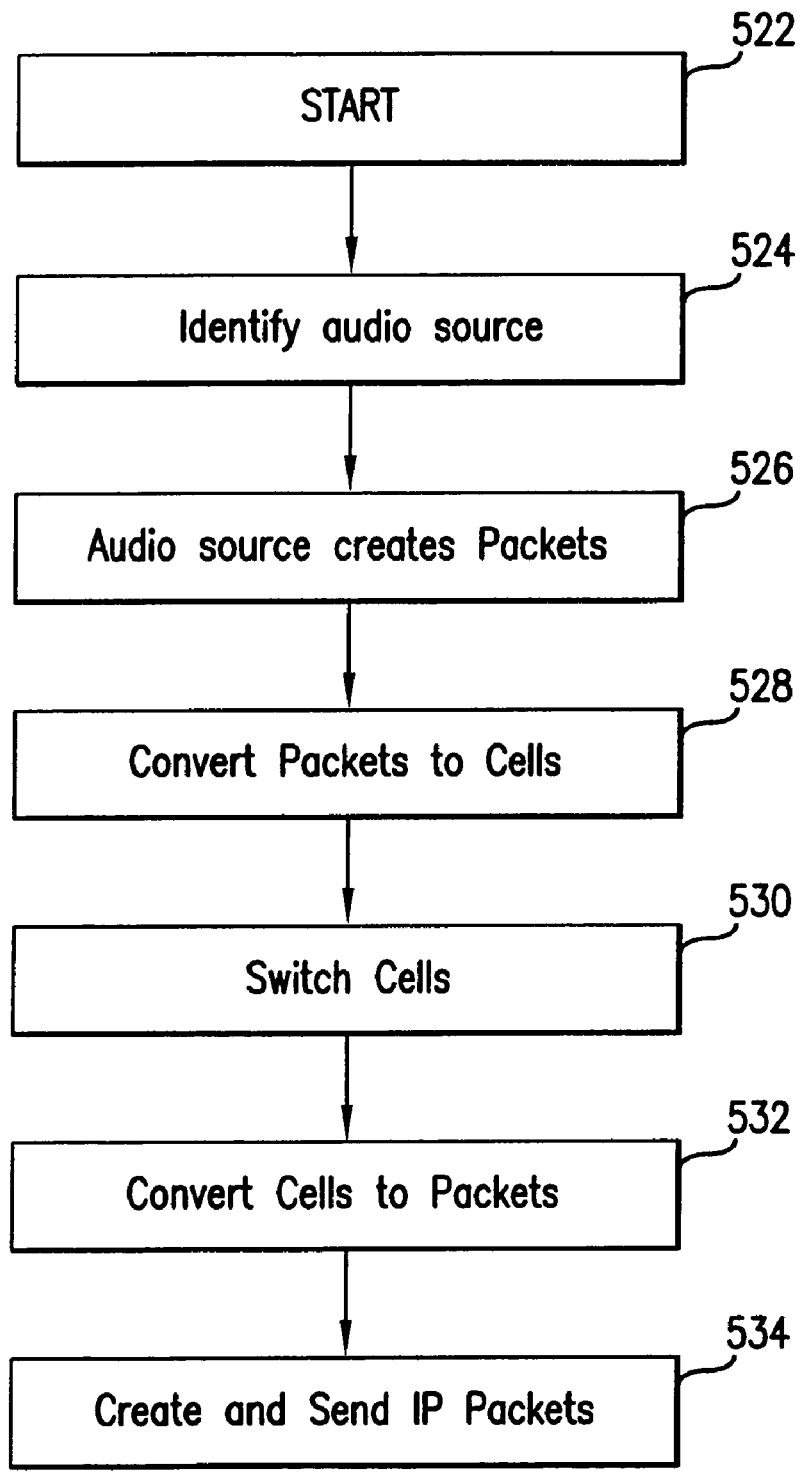
FIG. 5B is a flow diagram showing egress packet processing and call completion according to an embodiment of the present invention.

The operation of audio processing platform 230 is illustrated in the flow diagrams of FIGS. 5A and 5B. FIG. 5A is a flow diagram showing the establishment of a call and ingress packet processing according to an embodiment of the present invention. FIG. 5B is a flow diagram showing egress packet processing and call completion according to an embodiment of the present invention.

A. Ingress Audio Streams

In FIG. 5A, the process for an ingress (also called inbound) audio stream starts at step 502 and immediately proceeds to step 504.

In step 504, call control and audio feature manager 302 establishes a call with a client communicating via the network connections 305. In one embodiment, call control and audio feature manager 302 negotiates and authorizes access to the client. Once client access is authorized, call control and audio feature manager 302 provides IP and UDP address information for the call to the client. Once the call is established, the process immediately proceeds to step 506.

In step 506, packet processors 307 receive IP packets carrying audio via the network connections 305. Any type of packet can be used including but not limited to IP packets, such as Appletalk, IPX, or other type of Ethernet packets. Once a packet is received, the process proceeds to step 508.

In step 508, packet processors 307 check IP and UDP header address in search table to find associated SVC, and then convert the VOIP packets into internal packets. Such internal packets for example can be made up of a payload and control header as described further below with respect to FIG. 7B. Packet processors 307 then construct packets using at least some of the data and routing information and assign a switched virtual circuit (SVC). The SVC is associated with one of the audio channel processors 308, and in particular with one of respective DSP that will process the audio payload.

When a cell layer is used, internal packets are further converted or merged into cells, such as ATM cells. In this way, audio payloads in the internal packets are converted to audio payloads in a stream of one or more ATM cells. A conventional segmentation and reassembly (SAR) module can be used to convert internal packets to ATM cells. Once the packets are converted into the cells, the process proceeds to step 510.

In step 510, cell switch 304 switches the cells to the proper audio channel of the audio channel processors 308 based on the SVC. The process proceeds to step 512.

In step 512, audio channel processors 308 convert the cells into packets. Audio payloads in the arriving ATM cells for each channel are converted to audio payloads in a stream of one or more packets. A conventional SAR module can be used to convert ATM to packets. Packets can be internal egress packets or IP packets with audio payloads. Once the cells are converted into the internal packets, the process proceeds to step 514.

In step 514, audio channel processors 308 process the audio data of the packets in the respective audio channels. In one embodiment, the audio channels are related to one or more of the media services 213*a*–*e*. For example, these media services can be telebrowsing, voice mail, conference bridging (also called conference calling), video streaming, VOIP gateway services, telephony, or any other media service for audio content.

B. Egress Audio Streams

In FIG. 5B, the process for an egress (also called outbound) audio stream starts at step 522 and immediately proceeds to step 524.

In step 524, call control and audio feature manager 302 identifies an audio source. This audio source can be associated with an established call or other media service. Once the audio source is identified, the process immediately proceeds to step 526.

In step 526, an audio source creates packets. In one embodiment, a DSP in audio channel processor 308 is an audio source. Audio data can be stored in a SDRAM associated with the DSP. This audio data is then packetized by a DSP into packets. Any type of packet can be used including but not limited to internal packets or IP packets, such as Ethernet packets. In one preferred embodiment, the packets are internal egress packets generated as described with respect to FIG. 7B.

In step 528, an audio channel processor 308 converts the packets into cells, such as ATM cells. Audio payloads in the packets are converted to audio payloads in a stream of one or more ATM cells. In brief, the packets are parsed and the data and routing information analyzed. Audio channel processor 308 then construct cells using at least some of the data and routing information and assigns a switched virtual circuit (SVC). A conventional SAR module can be used to convert packets to ATM cells. The SVC is associated with one of the audio channel processors 308, and in particular with a circuit connecting the respective DSP of the audio source and a destination port 305 of NIC 306. Once the packets are converted into the cells, the process proceeds to step 530.

In step 530, cell switch 304 switches the cells of an audio channel of the audio channel processors 308 to a destination network connection 305 based on the SVC. The process proceeds to step 532.

In step 532, packet processors 307 convert the cells into IP packets.

Audio payloads in the arriving ATM cells for each channel are converted to audio payloads in a stream of one or more internal packets. A conventional SAR module can be used to convert ATM to internal packets. Any type of packet can be used including but not limited to IP packets, such as Ethernet packets. Once the cells are converted into the packets, the process proceeds to step 534.

In step 534, each packet processor 307 further adds RTP, IP, and UDP header information. A search table is checked to find IP and UDP header address information associated with the SVC. IP packets are then sent carrying audio via the network connections 305 over a network to a destination device (phone, computer, palm device, PDA, etc.). Packet processors 307 process the audio data of the packets in the respective audio channels. In one embodiment, the audio channels are related to one or more of the media services 213*a*–*e*. For example, these media services can be telebrowsing, voice mail, conference bridging (also called conference calling), video streaming, VOIP gateway services, telephony, or any other media service for audio content.

Figure 7A:
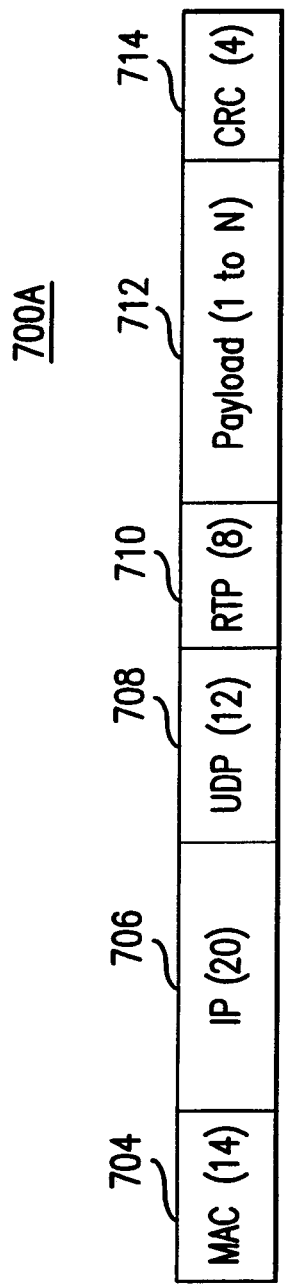
FIG. 7A is a schematic illustration of a real time protocol (RTP) packet.
Figure 7B:
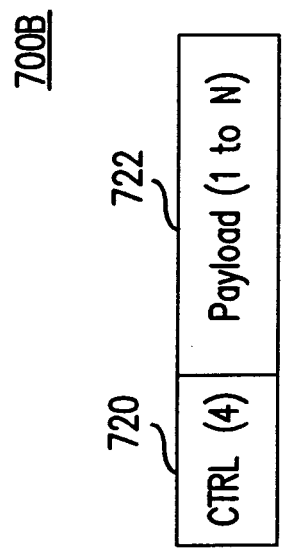
FIG. 7B is a schematic illustration of an internal packet according to one embodiment of the present invention.

In one embodiment, ingress and egress audio streams involve streams of RTP packets and internal packets. Accordingly, it is helpful to first describe RTP packets and internal packets (FIGS. 7A–7B). Next, system 600 and its operation is described in detail with respect to a routine for direct access to web audio content (FIGS. 8A–E).

IX. Packets

In one embodiment, the present invention uses two types of packets: (1) IP packets with RTP information (also called RTP packets) and (2) internal packets. Both of these types of packets are shown and described with respect to examples in FIGS. 7A and 7B. RTP packets 700A are sent and received over a external packet-switched network by packet processors 307 in NIC 306. Internal packets 700B are generated by NIC 306 or audio sources (e.g. DSPs) 604*a*–604*n* depending on the direction of traffic flow. NIC 306 converts RTP packets that arrive from a network to internal packets. Audio sources 604*a*–*n* generate and output internal packets directly on egress audio streams sent through cell switch 304 to NIC 306.

A. IP Packets with RTP Information

A standard Internet Protocol (IP) packet 700A is shown in FIG. 7A. IP packet 700A is shown with various components: media access control (MAC) field 704, IP field 706, user datagram protocol (UDP) field 708, RTP field 710, payload 712 containing digital data, and cyclic redundancy check (CRC) field 714. Real-Time Transport Protocol (RTP) is a standardized protocol for carrying periodic data, such as digitized audio, from a source device to a destination device. A companion protocol, Real-Time Control Protocol (RTCP), can also be used with RTP to provide information on the quality of a session.

More specifically, the MAC 704 and IP 706 fields contain addressing information to allow each packet to traverse an IP network interconnecting two devices (origin and destination). UDP field 708 contains a 2-byte port number that identifies a RTP/audio stream channel number so that it can be internally routed to the audio processor destination when received from the network interface. In one embodiment of the present invention, the audio processor is a DSP, as described herein.

RTP field 710 contains a packet sequence number and timestamp. Payload 712 contains the digitized audio byte samples and can be decoded by the endpoint audio processors. Any payload type and encoding scheme for audio and/or video types of media compatible with RTP can be used as would be apparent to a person skilled in the art given this description. CRC field 714 provides a way to verify the integrity of the entire packet. See, the description of RTP packets and payload types described by D. Collins, *Carrier Grade Voice over IP,* pp. 52–72 (the text of the entire book of which is incorporated herein by reference).

The present invention is not limited to RTP packets and in general any type of IP packet carrying audio can received and sent by a NIC in embodiments of the present invention.

B. Internal Packets

FIG. 7B illustrates an example internal packet of the present invention in greater detail. Packet 700B includes a control (CRTL) header 720 and a payload 722. The advantage of internal packet 700B is it is simpler to create and smaller in size than IP packet 700A. This reduces the burden and work required of audio sources and other components handling the internal egress packets.

In one embodiment, audio sources 604a–604n are DSPs. Each DSP adds a CRTL header 720 in front of a payload 722 that it creates in for a respective audio stream. CRTL 720 is then used to relay control information downstream. This control information for example can be priority information associated with a particular egress audio stream.

Packet 700B is converted to one or more cells, such as ATM cells, and sent internally over cell switch 304 to a packet processor 307 in network interface controller 306. After the cells are converted to internal egress packets, packet processor 307 decodes and removes internal header CRTL 720. The rest of the RTP packet information is added before the payload 722 is transmitted as an IP packet 700A onto an IP network. This achieves an advantage as processing work at the DSPs is reduced. DSPs only have to add a relatively short control header to payloads. The remaining processing work of adding information to create legal IP RTP packets can be distributed to packet processor(s) 307.

Similarly, packet 700B is also created for ingress streams that arrive at NIC 306 over a network. In this case, NIC 306 converts IP packets 700a to internal packets 700B. MAC and IP/UDP header information is stripped. RTP header information is also stripped. The control header in the internal packets can include control information for a desired a desired application.

Network interface controller (NIC) 306 processes all internal ingress and egress packets, as well as all egress RTP packets destined for the external network. Thus, NIC 306 can make final forwarding decisions about each packet sent to it based on the content of each packet. In some embodiments, NIC 306 manages the forwarding of egress RTP packets based on priority information. This can include barging-in an audio stream of egress RTP packets with a higher priority and buffering or not forwarding another audio stream of egress RTP packets with a lower priority.

X. Direct Access to Web Audio Content

A. System

Figure 6:
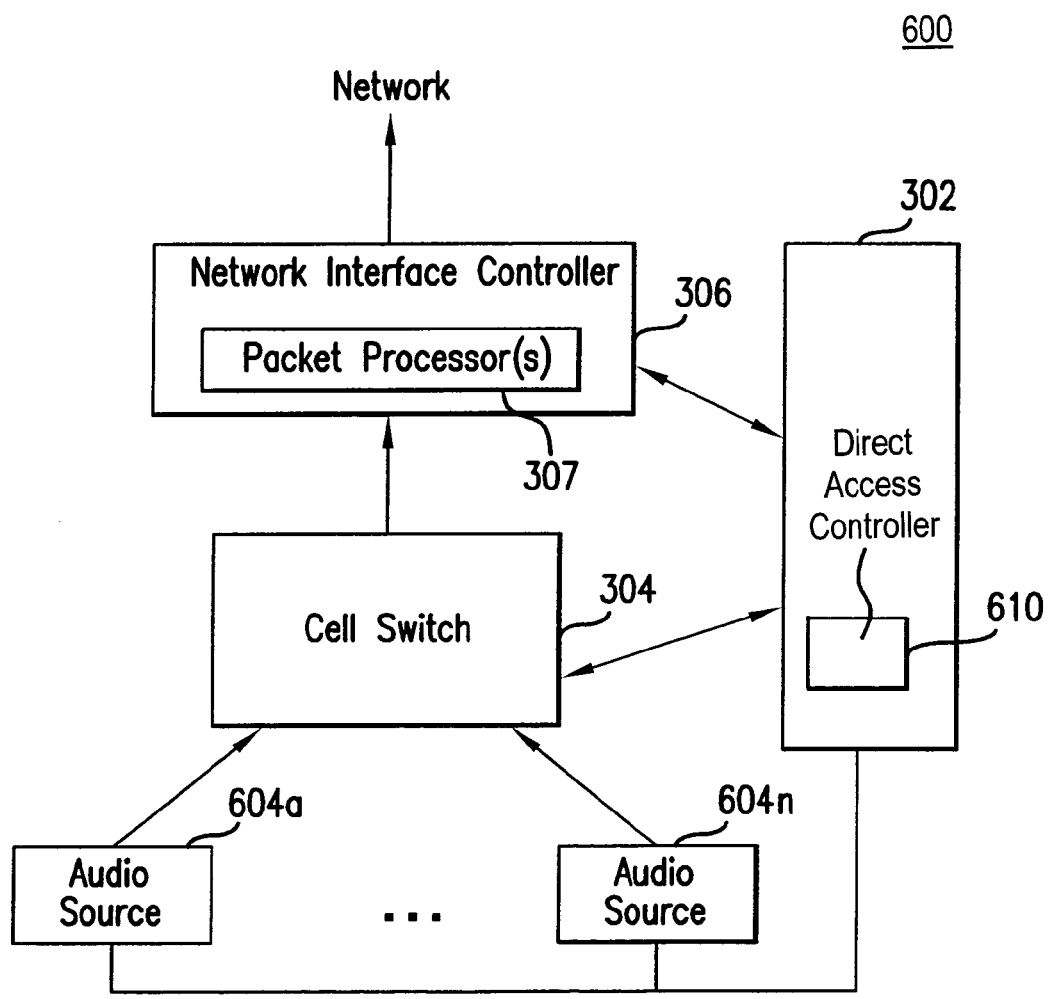
FIG. 6 is a diagram of two stage switching components in an audio processing platform that carries out switching among independent egress audio streams according to an embodiment of the present invention.

According to the one aspect of the present invention, audio processing platform 230 provides a telephone with direct access to a web audio content. FIG. 6 shows an embodiment of a system 600 for direct access to a web audio content. Direct access system 600 includes components of audio processing platform 230 configured for a direct access mode of operation. In particular, as shown in FIG. 6, direct access system 600 includes call control and audio feature manager 302 coupled to a number n of audio sources 604n, switch 304 (which can be a packet switch or a cell switch), and network interface controller 306. Audio sources 604a–604n can be one or more audio sources. Any type of audio source can be used including but not limited to digital signal processors (DSPs). In one example, DSPs 480 can be audio sources.

B. Direct Access Controller

Call control and audio feature manager 302 further includes a direct access controller 610. Direct access controller 610 is control logic that issues control signals to audio sources 604n, packet/cell switch 304, and/or network interface controller 306 to carry out direct access to a web audio content functionality according to the present invention. The control logic can implemented in software, firmware, hardware or any combination thereof.

C. Fully Meshed Switch

Direct access system 600 can be thought of as a "free pool" of multiple input (ingress) and output (egress) audio channels because a fully meshed packet/cell switch 304 is used to switch audio channels to participate in any given call. Any available ingress and/or egress audio channel can be called upon to participate in a telephone call at any time. The fully meshed switching capability of system 600 of the present invention allows an audio processing platform to scale to handle large number of users accessing web audio content at a carrier-grade service level. When demand rises, additional NICs and DSPs can be added through switch 304 to support additional channels. In addition, a two-stage ingress and egress switching technique is used.

D. Two-Stage Ingress and Egress Switching

Direct access system 600 includes at least two stages of switching. In terms of ingress switching, the first stage is within network interface controller (NIC 306) and the second stage is within cell switch 304. In terms of egress switching, the first stage is within cell switch 304 and the second stage is within NIC 306.

According to the present invention, direct access controller 610 sets up a first audio channel through cell switch 304 in a connection phase. The connection phase couples an audio source on a media server and a telephone making a call. Direct access controller 610 sets up a second audio channel through cell switch 304 in an audio transport phase. The audio transport phase transports web audio content directly from a remote web server to the audio source on the second audio channel and then from the audio source to the user of the telephone on the first audio channel. The connection phase and audio transport phase carried out through direct access system 600 are further described with respect to routine 800 below.

E. Routine for Direct Access to Web Content Via Telephone

Figure 8A:
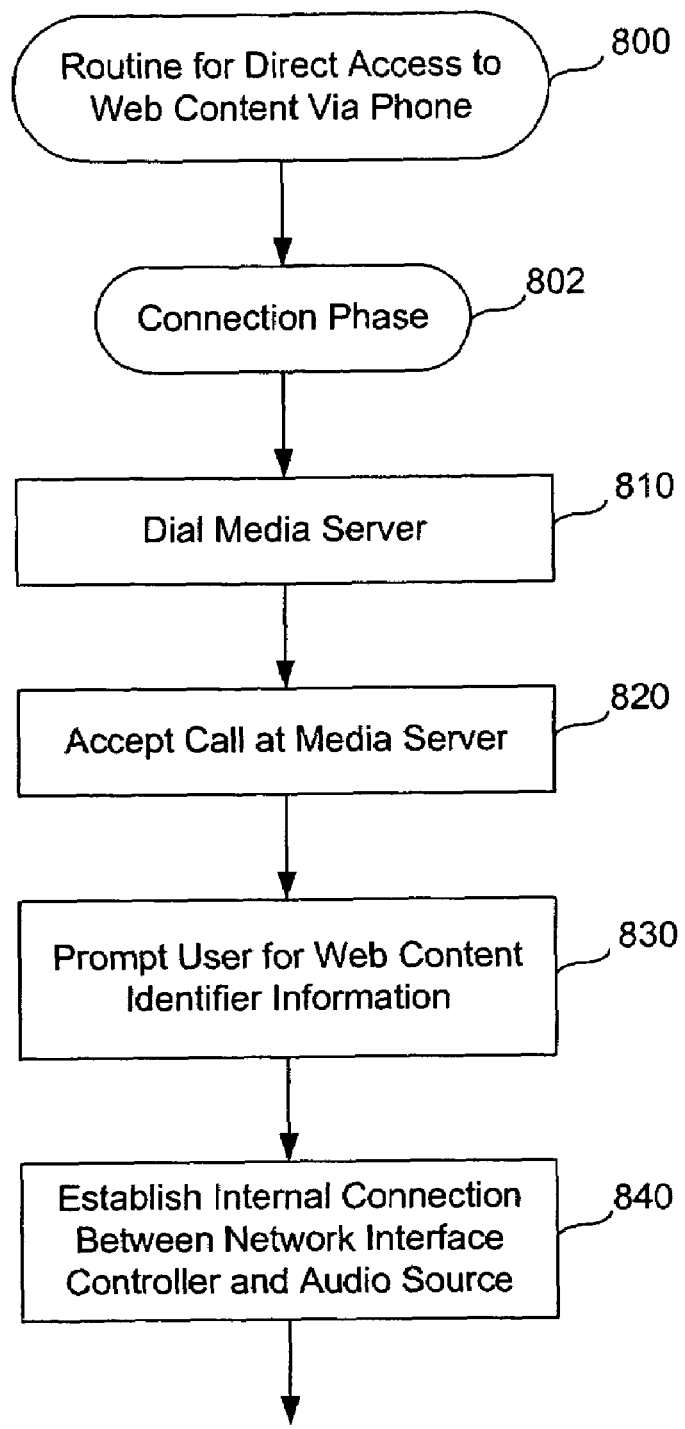
FIGS. 8A, 8B, 8C, 8D and 8E are flow diagrams showing a routine for direct access to web audio content via a telephone according to one embodiment of the present invention.
Figure 8B:
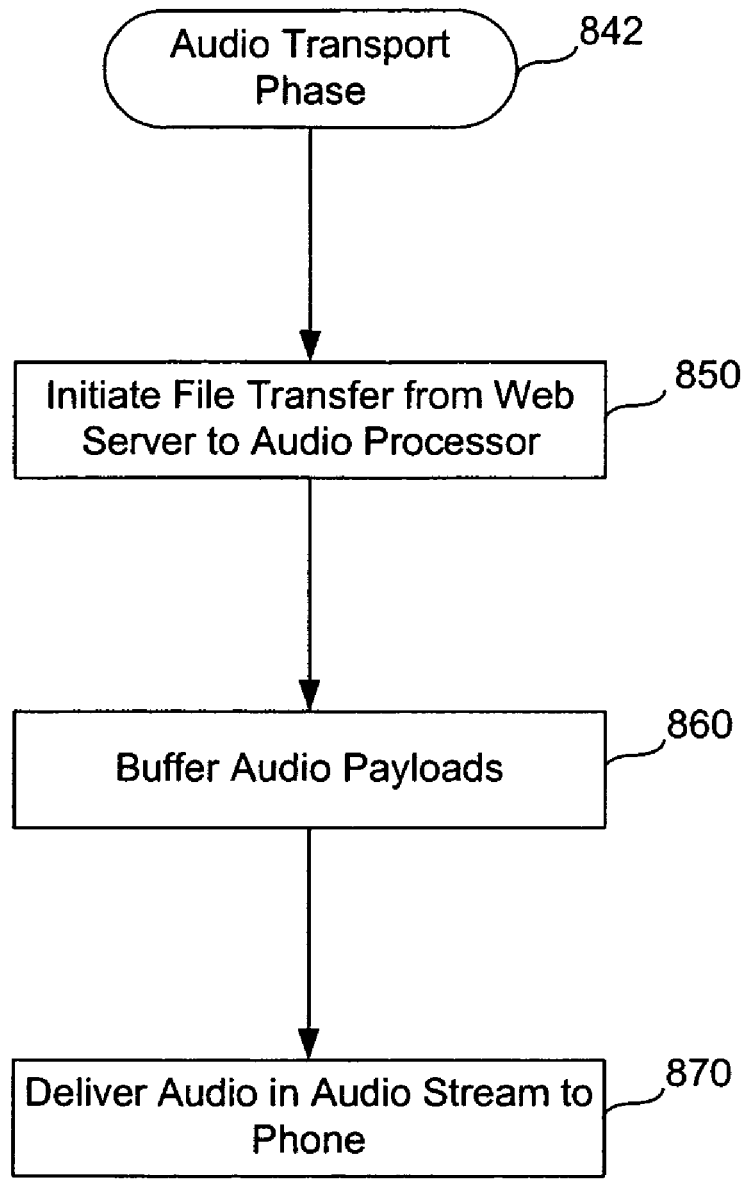
Figure 8C:
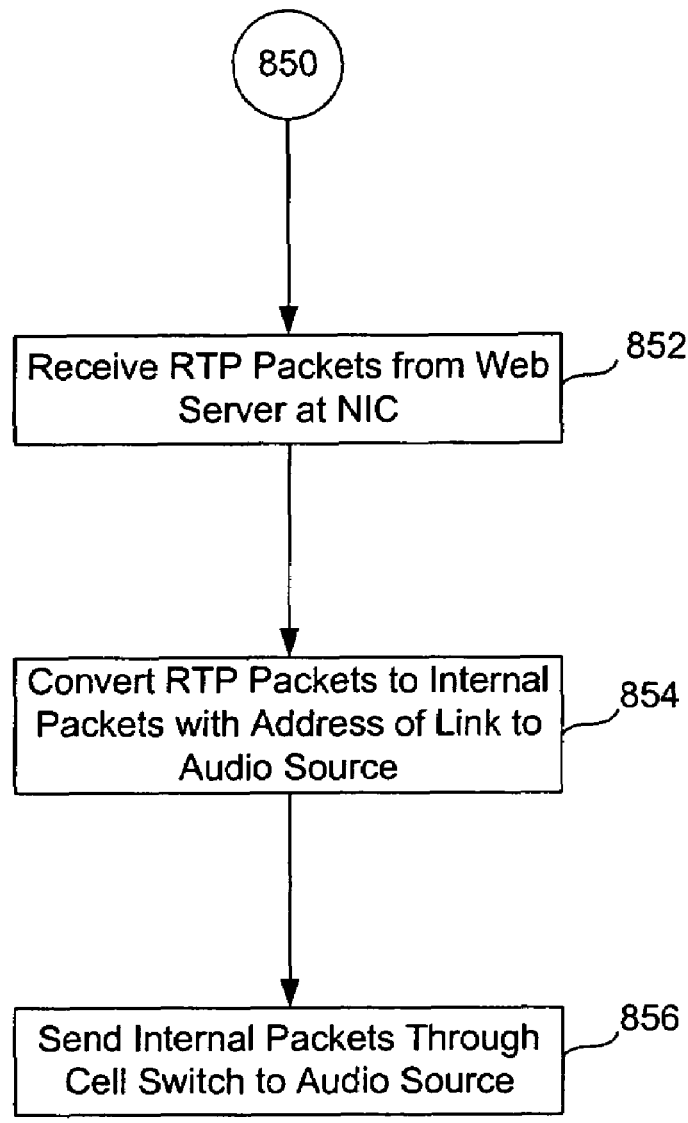
Figure 8D:
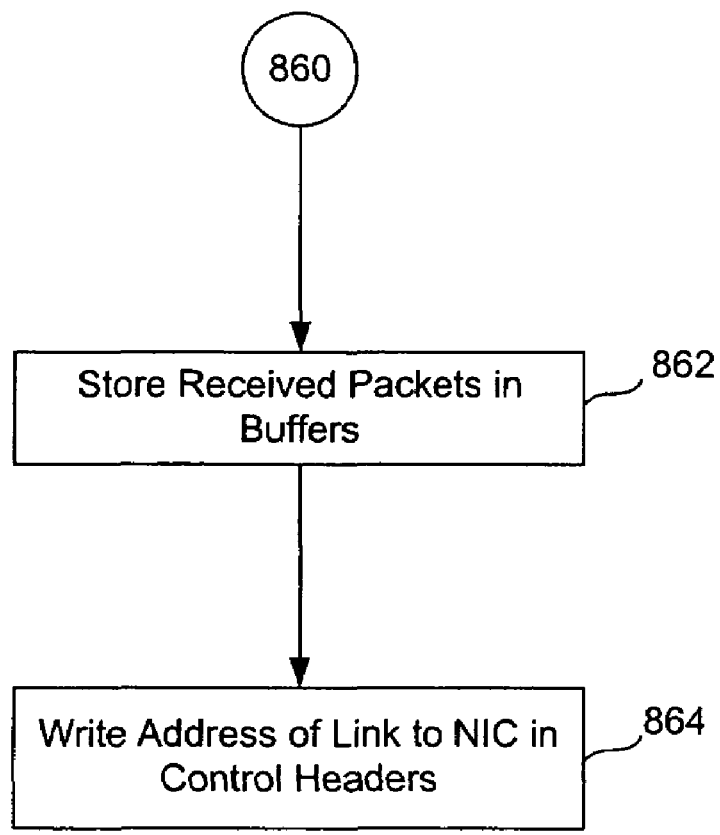
Figure 8E:
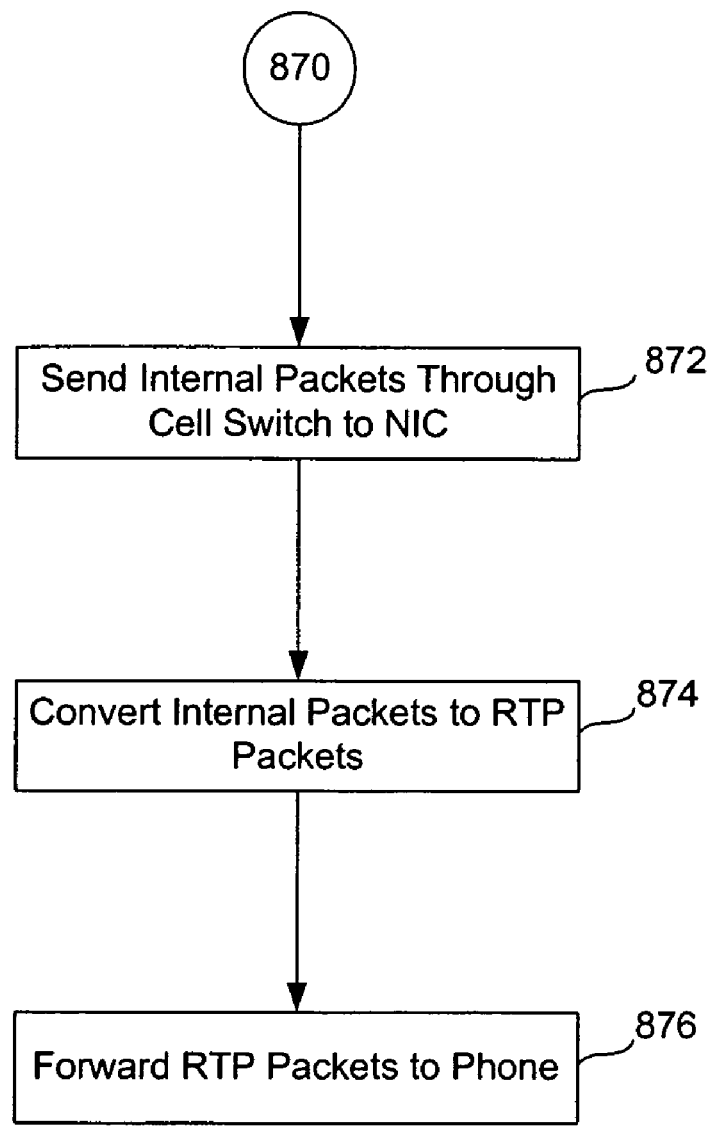

FIGS. 8A–8E are flowcharts of a routine 800 for direct access to web content via telephone according to an embodiment of the present invention. FIG. 8A is a flow diagram of the operation of a connection phase 802 (steps 810–840). FIG. 8B is a flowchart of an audio transport phase 842 (steps 850–870). FIG. 8C is a flow diagram illustrating a file transfer step 850 in greater detail (steps 852–856). FIG. 8D is a flowchart illustrating buffering of audio step 860 in greater detail (steps 862–864). FIG. 8E is a flow diagram illustrating the audio delivery step 870 in greater detail (steps 872–876). Routine 800 is now described below with reference to audio processing platform 230 and in particular with respect to the audio processing platform 600 including direct access controller 610 as described above with respect to FIG. 6.

i. Connection Phase

In connection phase 802, a telephone first dials a media server (step 810). Any conventional VOIP signaling can be used in this step. For example, telephone 105 can dial media server 140 through gateway 130. Softswitch 120 requests an incoming SIP call via SIP to an application server (not shown) coupled to media server 140. Application server then relays a connection request with end-point address information to media server 140 via a media gateway control protocol MGCP.

In step 820, the call is accepted at media server 140. Media server 140 determines the type of call and selects an audio processor 604a–604n to accommodate the call. In one embodiment, media server 140 can provide direct access as a special service. In this case, determining the type of call involves determining whether the telephone is a subscribed customer that qualifies for the special service. In another embodiment, any call can be provided with direct access. In this case, the type of call determination step is omitted.

In step 830, the user (that is the person that placed the call in step 810) is prompted for web content identifier information. Web content identifier information can be any identifier of web audio content. For example, web content identifier information can include, but is not limited to, an Internet protocol (IP) address of a file server and a file path on the file server. Any conventional file server, such as an NFS server, Windows NT server, SOIP server, or Novell server, can be used.

Direct access controller 610 can communicate with a user of a telephone to obtain the web content identifier information. In one example, a user is prompted through an interactive voice recognition IVR session to provide web content identifier information. A user is first asked, "Do you wish to access web content directly?" A user inputs on the telephone the appropriate command indicating that direct web access content is requested. Such input to the telephone can be made through speech, keystrokes, touch, stylus, or any other type of input. The user is then prompted to enter the web content identifier information. The user enters the appropriate web content identifier information through the telephone. This entry can also be made at the telephone through speech, keystrokes, touch, stylus, or any other type of input.

Alternatively, in some embodiments, a user can be provided with web content identifier information automatically. For example, a user can be prompted with requests to hear predetermined web audio content. A user can be asked, "Do to you wish to hear interviews with leading high-tech executives from the CNN web site? If yes, press 1. Do you wish to hear a leading Montessori elementary teacher speak on cosmic education from the YAHOO web site? If yes, press 2. Do you wish to hear a newly released song on the Emusic web site? If yes, press 3."

In another embodiment, the user is provided with requests to hear predetermined web audio content based on the user's profile and preferences. An application at the application server or the media server can determine or look-up a user's profile and preferences based on the user's telephone number. For example, a user who dials in from an area code in Virginia can be provided with requests to hear predetermined web audio content relevant to Virginia interests or sponsors. Alternatively, a user who dials in who has already subscribed can be provided with requests to hear predetermined web audio content based on the user's own profile and preferences. The user's telephone number can be used to look-up a corresponding user profile and preferences in a database. The user's profile and preferences can be established by the user or determined automatically based on any known information about the user. For example, a user interested in gardening and comedy can be provided with requests to hear predetermined web audio content related to gardening and comedy stored in audio files on one or more remote web sites. Similarly, a user interested in Baptist preaching can be provided with requests to hear predetermined web audio content related to local and national sermons stored in audio files on one or more remote web sites.

Once web content identifier information is provided or selected, an internal connection is established (step 840). In particular, an internal connection is established between a network interface controller and an audio processor. In one embodiment, direct access controller 610 assigns a switched virtual circuit SVC corresponding to a first audio channel to link network interface controller 306 through cell switch 304 to one of the audio sources 604*a*–604*n*. A table entry is stored at NIC 306 that associates the telephone making the call and the assigned SVC. For example, a table can store the telephone number linked to a VPI/VCI address of the assigned SVC in a relational database. An audio channel handled by one of the audio sources 604*a*-can also be linked to the telephone number and VPI/VCI address of the assigned SVC in a relational database. Table entries or a copy of the table can also be stored for access by audio sources 604.

ii. Audio Transport Phase

Audio transport phase 842 includes initiating a file transfer from web server to audio processor (step 850), buffering audio payloads received from the web server (step 860), and delivering the buffered audio in an audio stream to the telephone (step 870). Each of these steps is described in further detail below with respect to FIGS. 8C, 8D, and 8E.

In audio transport phase 842, file transfer is initiated from a web server to an audio processor on a second audio channel (step 850). The web server corresponds to a web server identified by the web content identifier information provided in step 830. The audio processor is the audio processor handling the first audio channel designated in the establishment of the internal connection in step 840. Any conventional file transfer operation over a packet switched network such as the Internet can be used. For example, audio files can be delivered using a real-time transport protocol such as RTP/RTCP.

FIG. 8C shows one embodiment for carrying out initial file transfer (steps 852–856). In step 852, RTP packets carrying an audio file are received from the web server at network interface controller 306. In step 854, the received RTP packets are converted to internal packets having an address of the internal connection link in the second audio channel to the designated audio processor. RTP header information unnecessary for internal cell switch processing is stripped and saved in a table entry associated with the assigned VPI/VCI identifying the SVC.

In one embodiment, the internal packets format as described above with respect to packet 700*b* in FIG. 7B is used. These internal packets includes an audio payload and control header. The audio payload includes the audio data itself. The control header includes the assigned VPI/VCI of the SVC of the second audio channel. The conversion to an internal packet format is optional and saves bandwidth and processing work at the audio sources. The internal packets are then incorporated into a stream of internal cells, such as ATM cells.

In step 856, the internal cells are sent through cell switch 304 to the audio source at the other end of the SVC. Control then returns to step 860.

FIG. 8D shows buffering of audio payloads in step 860 according to an embodiment of the present invention (steps 862–864). In step 862, received cells are stored in buffers at the audio source (e.g. audio source 604*a*). In one example, a digital signal processor memory, such as a SDRAM, is attached to a segmentation and reassembly (SAR) module. The DSP SDRAM contains up to 192 receive buffers.

In step 864, the address of a link to network interface controller is written into control headers. For example, the address of a link to network interface controller 306 coupled to the telephone is written in the control headers of internal packets. This address can be the assigned VPI/VCI address of a SVC of the first audio channel between the audio source 604*a* and NIC 306. At this point, at audio source 604*a*, audio payloads are stored in internal packets with address information pointing to the NIC 306 handling the egress packet streams to the telephone. Control then returns to step 870.

FIG. 8E shows an embodiment of audio delivery step 870 (steps 872–876). In step 872, the internal packets addressed to network interface controller 306 are sent through cell switch 304 in the first audio channel to NIC 306. In one embodiment, internal packets are delivered in a stream of cells such as ATM cells.

In step 874, the internal packets are converted to RTP packets. If cell were used, the stream of ATM cells is first converted to a stream of internal packets. The internal packets are then converted to RTP packets. For example, packet processors 307 can convert internal packets to RTP packets with header information addressed to a telephone destination device of the call established in connection phase 802. In step 876, the RTP packets are forwarded to the telephone. In this way, the user at the telephone receives the desired web audio content directly from audio processors. The audio processors, however, do not have to store permanently the actual audio files. The audio is just streamed from the file source identified by the user in the interactive prompt session. This allows a media server to scale to accommodate many users requesting direct access to web content on any number of remote web sites without having to permanently stored audio data files. This greatly reduces memory and processing costs.

As described above in steps 860–870, audio is being processed by audio processor(s) at an audio source 604. According to a further feature of the present invention, any additional desired audio processing can be carried out on the audio stream as it is processed by one of the audio sources 604a–604n. For example, an audio processor can insert audio into the audio stream or convert the audio stream from one format to another (ie. transcode or convert between CODECs). The audio stream can be mixed, filtered, enhanced or modified in accordance with any known audio processing techniques.

The above description with respect to direct access of audio streams of packets can also be performed to directly access video streams of packets such as a video stream of RTP packets. In this case, a video stream processor is used in place of an audio source 604 or added as a further feature of an audio source 604. If video streams are being processed according to the present invention, labels or other images can be inserted by a processor into a channel. In other respects, a direct access system handling video streams operates as described above with respect to the audio streams. For instance, in one embodiment handling video streams of RTP packets, direct access controller 610 establishes a first channel through switch 304 between network interface controller 306 and a video stream processor at a source 604 in a connection phase. Direct access controller 610 then establishes a second channel through switch 304 between the video stream processor at a source 604 and network interface controller 306 in a video transport phase. In the video transport phase, web video content is transported directly from a remote web server to the video stream processor on the second channel and then from the video stream processor to the user of the telephone on the first channel. Additional video processing operations such as special effects, adding labels, etc., can be carried out by video stream processor if desired before passing the video stream to a telephone or other type of terminal device.

In one embodiment, a method which provides a user of a telephone with direct access to web video content over a network includes establishing a first channel through a switch between a network interface controller and a video stream processor in a connection phase; and establishing a second channel through a switch between the video stream processor and a network interface controller in a video transport phase that transports web video content directly from a remote web server to the video stream processor on the second channel and then from the video stream processor to the user of the telephone on the first channel. In one embodiment, the method further includes processing a video stream in the web video content (such as a video stream of RTP packets) transported in the transport phase prior to transporting the video stream from the video stream processor to the user of the telephone. For example, such video processing can include any type of video processing including, but not limited to, inserting additional video into the video stream, converting the video stream from one format to another format, enhancing video in the video stream, and modifying video in the video stream.

These examples are illustrative and not intended to limit the present invention. Any additional audio and/or video processing operations in audio source 604 can be carried out by an audio and/or video processor, such as a DSP, as would be known to person skilled in the art given this description.

XI. Control Logic

Functionality described above with respect to the operation of direct access system 600 can be implemented in control logic. Such control logic can be implemented in software, firmware, hardware or any combination thereof.

CONCLUSION

While specific embodiments of the present invention have been described above, it should be understood that they have been presented by way of example only, and not limitation. It will be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined only in accordance with the following claims and their equivalents.

What is claimed is:

1. A method for providing direct access to web audio content over a network, comprising:
(A) establishing a call between a communications device and a media server, wherein the media server includes a network interface controller and an audio source;
(B) receiving web content identifier information; and
(C) establishing an internal channel between the network interface controller and the audio source through a cell switch internal to the media server, whereby the audio source can deliver web audio content corresponding to the web content identifier information to the communications device in the established call.

2. The method of claim 1, further comprising:
(E) initiating a file transfer of the web audio content from a remote web server identified in the web content identifier information to the audio source.

3. The method of claim 2, further comprising:
(F) buffering audio payloads containing audio data from the file transferred from the remote web server.

4. The method of claim 3, further comprising:
(G) delivering the buffered audio data in an audio stream to the communications device.

5. The method of claim 2, wherein said initiating step (E) comprises:
receiving RTP packets from the remote web server at the network interface controller;
converting the received RTP packets to internal packets having an audio payload and control header, the control header including addressing information associated with the internal channel between the network interface controller and the audio source through the cell switch; and sending the internal packets on the link through the cell switch to the audio source.

6. The method of claim 5, wherein the cell switch switches ATM cells, the link comprises a switched virtual circuit (SVC), and the address comprises a VPI/VCI that identifies a switch virtual path and switch virtual channel, and wherein said sending internal packet step includes converting the internal packets to one or more ATM cells and sending the ATM cells to the cell switch.

7. The method of claim 5, further comprising:
storing internal packets at the audio source, the internal packets including audio payloads from the sent internal packets received at the audio source and a control header having addressing information associated with the internal channel between the network interface controller and the audio source through the cell switch.

8. The method of claim 7, further comprising
sending the stored internal packets from the audio source through the cell switch to the network interface controller coupled to the communications device;
converting the sent internal packets at the network interface controller to RTP packets; and
forwarding the RTP packets to the communications device.

9. The method of claim 8, wherein the cell switch switches ATM cells, the link comprises a switched virtual circuit (SVC), and the address comprises a VPI/VCI that identifies a switch virtual path and switch virtual channel, and wherein said sending the stored internal packet step includes converting the stored internal packets to one or more ATM cells and sending the ATM cells to the cell switch.

10. A method for providing direct access to web audio content over a network, comprising:
establishing a first communications channel between a communications device and a media server, wherein the media server includes a network interface controller and an audio source, and wherein the first communications channel includes a first internal audio channel between the network interface controller and the audio source through a switch internal to the media server;
establishing a second communications channel between a remote web server and the media server, wherein the second communications channel includes a second internal audio channel through the switch between the audio source and the network interface controller, wherein web audio content is delivered from the remote web server to the audio source on the second audio channel; and
delivering the web audio content from the audio source to the communications device over the first communications channel.

11. The method of claim 10, further comprising processing an audio stream in the web audio content prior to transporting the audio stream from the audio source to the communications device.

12. The method of claim 11, wherein said processing includes at least one of the following steps: inserting additional audio into the audio stream, converting the audio stream from one format to another format, mixing audio into the audio stream, filtering the audio stream, enhancing audio in the audio stream, and modifying audio in the audio stream.

13. A system for providing direct access to web audio content over a network, comprising:
(A) means for establishing a call between the communications device and a media server, wherein the media server includes a network interface controller and an audio source;
(B) means for receiving web content identifier information; and
(C) means for establishing an internal channel between the network interface controller and the audio source through a cell switch internal to the media server, whereby the audio source can deliver web audio content corresponding to the web content identifier information to the communications device in the established call.

14. The system of claim 13, further comprising:
(E) means for initiating a file transfer of the web audio content from a remote web server identified in the web content identifier information to the audio source.

15. The system of claim 14, further comprising:
(F) means for buffering audio payloads containing audio data from the file transferred from the remote web server.

16. The system of claim 15, further comprising:
(G) means for delivering the buffered audio data in an audio stream to the communications device.

17. A system for providing direct access to web audio content over a network, comprising:
means for establishing a first communications channel between a communications device and a media server, wherein the media server includes a network interface controller and an audio source, and wherein the first communications channel includes a first internal audio channel between the network interface controller and the audio source through a switch internal to the media server;
means for establishing a second communications channel between a remote web server and the media server, wherein the second communications channel includes a second internal audio channel through the switch between the audio source and the network interface controller, wherein web audio content is delivered from the remote web server to the audio source on the second audio channel; and
means for delivering the web audio content from the audio source to the communications device over the first communications channel.

18. A media server, comprising:
a direct access controller;
a network interface controller;
an audio source; and
a switch;
wherein said switch is coupled between said network interface controller and said audio source, and
wherein said media server establishes a first communications channel between the media server and a communications device, wherein said first communications channel includes a first internal audio channel between said network interface controller and said audio source through said switch establishes a second communications channel between the media server and a remote web server, wherein said second communications channel includes a second internal audio channel through said switch between said audio source and said network interface controller wherein web audio content is delivered from the remote web server to the audio source on the second audio channel and delivers said web audio content from the audio source to the communications device on the first communications channel.

19. A media server, comprising:
a direct access controller;
a network interface controller;
a video stream processor; and
a switch;
wherein said switch is coupled between said network interface controller and said video stream processor; and
wherein said media server establishes a first communications channel between said media server and a communications device, wherein said first communications channel includes a first internal media channel between said network interface controller and said video stream processor through said switch establishes a second communications channel between the media server and a remote web server, wherein said second communications channel includes a second internal media channel through said switch between said video stream processor and said network interface controller wherein web video content is delivered from said remote web server to the said video stream processor on the second internal media channel and delivers said web video content from said video stream processor to said communications device on said first communications channel.

20. A method for providing direct access to web video content over a network, comprising:

establishing a first communications channel between a communications device and a media server, wherein the media server includes a network interface controller and a video stream processor, and wherein the first communications channel includes a first media channel between the network interface controller and the video stream processor through a switch internal to the media server;

establishing a second communications channel between a remote web server and the media server, wherein the second communications channel includes a second media channel through the switch between the video stream processor and the network interface controller, wherein web video content is delivered from the remote web server to the video stream processor on the second media channel; and delivering the web video content from the video stream processor to the communications device over the first communications channel.

* * * * *

UNITED STATES PATENT AND TRADEMARK OFFICE
CERTIFICATE OF CORRECTION

PATENT NO.         : 7,016,348 B2
APPLICATION NO. : 09/939798
DATED              : March 21, 2006
INVENTOR(S)        : Laursen et al.

Page 1 of 1

It is certified that error appears in the above-identified patent and that said Letters Patent is hereby corrected as shown below:

In column 22, beginning on line 25, claims 21 and 22 should be inserted as follows:

--21. The method of claim 20, further comprising processing a video stream in the web video content prior to transporting the video stream from the video stream processor to the communications device.

22. The method of claim 21, wherein said processing includes at least one of the following steps: inserting additional video into the video stream, converting the video stream from one format to another format, enhancing video stream, and modifying video in the video stream.--.

Signed and Sealed this

Twenty-second Day of August, 2006

JON W. DUDAS
*Director of the United States Patent and Trademark Office*